United States Patent

Petit et al.

[15] 3,706,986

[45] Dec. 19, 1972

[54] SAMPLING METHODS AND DEVICES, MORE PARTICULARLY FOR ANALOG-DIGITAL CONVERSIONS

[72] Inventors: Gérard Petit, Balma Lasbordes; Pierre Bricard, Saint Michel-sur-Orge, both of France

[73] Assignee: Centre National D'Etudes Spaliales, Paris, France

[22] Filed: Jan. 13, 1971

[21] Appl. No.: 106,204

[30] Foreign Application Priority Data

Jan. 14, 1970 France ................................7001281

[52] U.S. Cl. .......................340/347 AD, 340/347 NT

[51] Int. Cl. ............................................H03r 13/20

[58] Field of Search...340/347 AD, 347 NT; 235/183

[56] References Cited

UNITED STATES PATENTS

| | | | |
|---|---|---|---|
| 3,002,690 | 10/1961 | Meyer | 340/347 NT |
| 3,316,547 | 4/1967 | Ammann | 340/347 NT |
| 3,414,898 | 12/1968 | Barton | 340/347 NT |
| 3,541,320 | 11/1970 | Beall | 340/347 NT |
| 3,566,397 | 2/1971 | Walton | 340/347 NT |

*Primary Examiner*—Thomas A. Robinson
*Attorney*—Brufsky, Staas, Breiner & Halsey

[57] ABSTRACT

A device for sampling an input analog voltage and comparing it to a reference voltage, wherein, in the course of a sampling period, an amplifier applies the input analog voltage to a memory wherein it is stored, and thereafter during a comparison period the reference voltage is applied alone to the same amplifier and the difference between it and the previously stored voltage is applied to a comparator.

8 Claims, 4 Drawing Figures

SAMPLING METHODS AND DEVICES, MORE PARTICULARLY FOR ANALOG-DIGITAL CONVERSIONS

The present invention, which falls within the province of data processing, relates to the conversion of an analog electrical voltage into a number.

Figure 1:
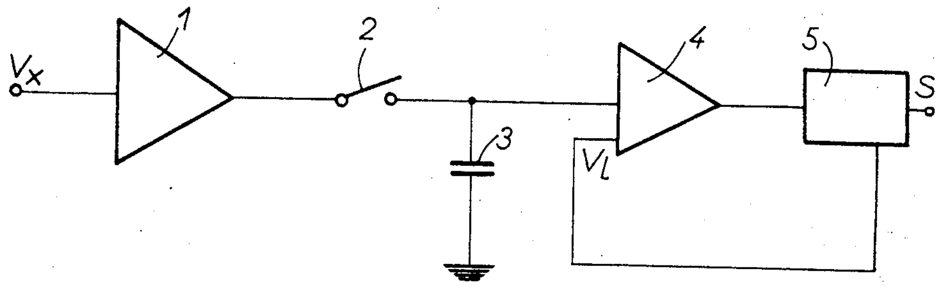

Already well-known per se is an encoding sampler, a representative block diagram of which is shown in FIG. 1. The possibly fluctuating analog voltage $Vx$ is analyzed during successive cycles for the purpose of being quantized. Each cycle is subdivided into two consecutive periods. During the first period, which may be called the sampling period, the voltage $Vx$ applied to a no-drift copy amplifier 1 of unit gain is transferred and charges a capacitor 3 in the process, the switch 2 being closed.

During the second period, which may be called the encoding period, the voltage in capacitor 3 is applied to a comparator amplifier 4 together with the reference voltage $V_L$ produced by a network 5 known as a ladder network. Comparator amplifier 4 controls the successive variations in the voltage delivered by the ladder network, which variations enable the encoding to take place. The number consisting of a series of digits, equivalent to the analog voltage $Vx$, appears on the output S.

It is to be noted that capacitor 3 is connected across the input of comparator 4 (which may be connected to the copy amplifier output) and earth. The single switch 2 can be in either of two positions, corresponding respectively to the phases of sampling (switch closed) and encoding (switch open). In addition to the previously stated requirement for no-drift gain preferably equal to unity, the above arrangement possesses the following characteristics and disadvantages:

— The memory capacitor must not discharge itself during encoding; this requires, in particular, that the comparator have a high input impedance.

— The switch must not disturb the charge in the memory capacitor when it opens and must be an effective isolating element between the amplifier and the memory capacitor when it is no longer closed.

For the type of measurements herein considered, the switch is of the electronic type and may consist for example of a field-effect transistor. The latter necessarily presents stray capacitances which could introduce errors by transmitting from the switch output the variations in output voltage of amplifier 1 during the encoding and the variations in switch control voltage at the start of the encoding. In the case of a field-effect transistor type switch, the error term introduced by variations of the latter type will be function of the difference between $Vx$ (voltage of the control electrode of the switch when the same is conducting) and the voltage of the control electrode of the switch when the same is non-conducting.

If the error in the charge of the memory capacitor due to a 1.5 pF variation in grid/drain capacitance is to be limited to one per mil of the measurement range, a memory capacitor of at least 4,500 pF must be used; if the error due to the source/drain capacitance, estimated at 3 pF, is to be limited to the same magnitude, a memory capacitor of at least 300 pF must be used. Other causes of analog errors also appear if the switch is of a different type. Further, being provided with a negative feedback loop in order to obtain unit gain, the operational amplifier is usually unable to provide a large current. In practice, therefore, it is necessary to follow it up with an adaptor capable of supplying the current for charging the memory capacitor.

The foregoing disadvantages stem from the classic sampling-encoding method utilizing an analog-digital converter which, as stated precedingly, includes a copy amplifier feeding a memory capacitor and a comparator which compares the voltage stored in this memory with reference voltages and which controls means for delivering said reference voltages to allow the encoding. This method comprises, for each cycle, two consecutive periods, namely a sampling period during which the analog voltage applied to the copy amplifier produces information in the form of a voltage stored in the memory, and an encoding period during which the comparator receives and compares (on two distinct respective inputs) said information with said reference voltages.

It is the object of the present invention to overcome the above-mentioned disadvantages by providing an improved method of sampling and encoding, preferably utilizing an arrangement which is particularly simple and advantageous.

It has been found that it is possible to use an amplifier that is not strictly a copy amplifier (i.e., not necessarily of unit gain) if, during the second period of utilization of the analog-digital converter (i.e. during the encoding period), the information referred to precedingly is applied to the comparator for comparison with the reference voltages but the reference voltage is applied instead to the amplifier input.

The desired result is achieved by series-connecting the amplifier, the memory capacitor and the comparator without connecting a switch into this series channel, and by providing the means for effecting the switchings corresponding to said two periods in the form of at least one switch controlling the amplifier input and a short-circuiting switch connected between earth and the junction from the memory capacitor to the comparator. By virtue of this series arrangement and the fact that the voltage to be encoded and the reference voltage are applied to the same input of the amplifier driving this series channel, the drifts cancel each other out.

The description which follows with reference to the accompanying non-limitative exemplary drawings will give a clear understanding of how the invention can be carried into practice.

Figure 2:
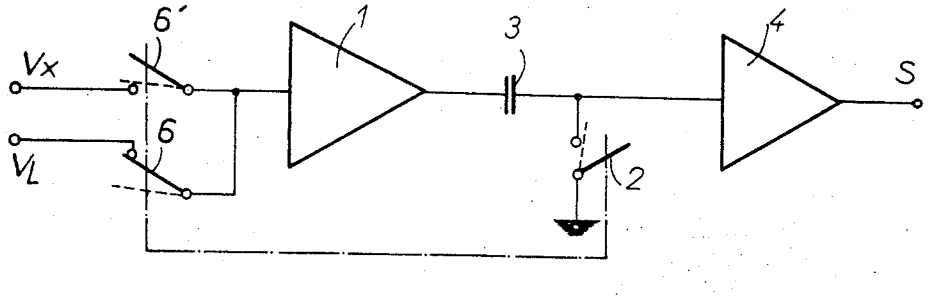
Figure 3:
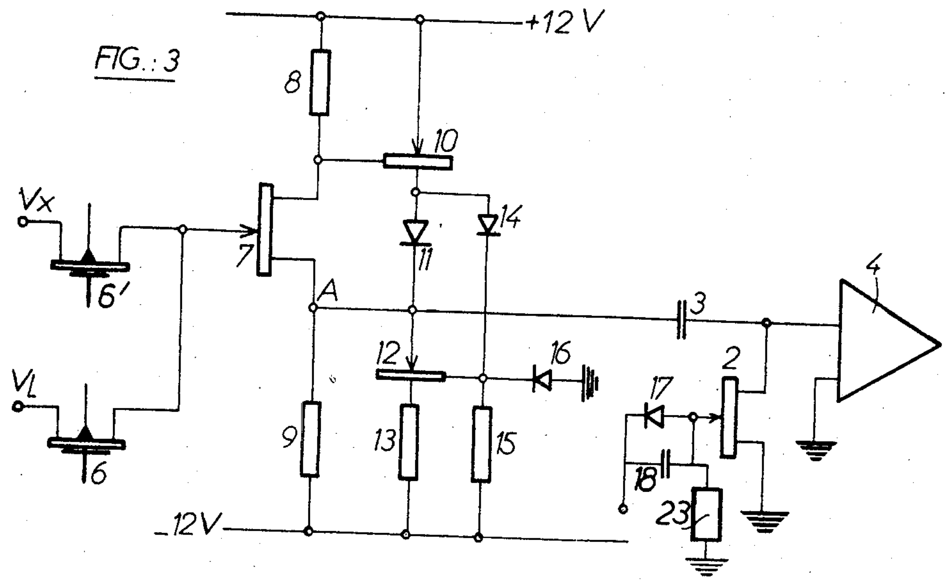
Figure 4:
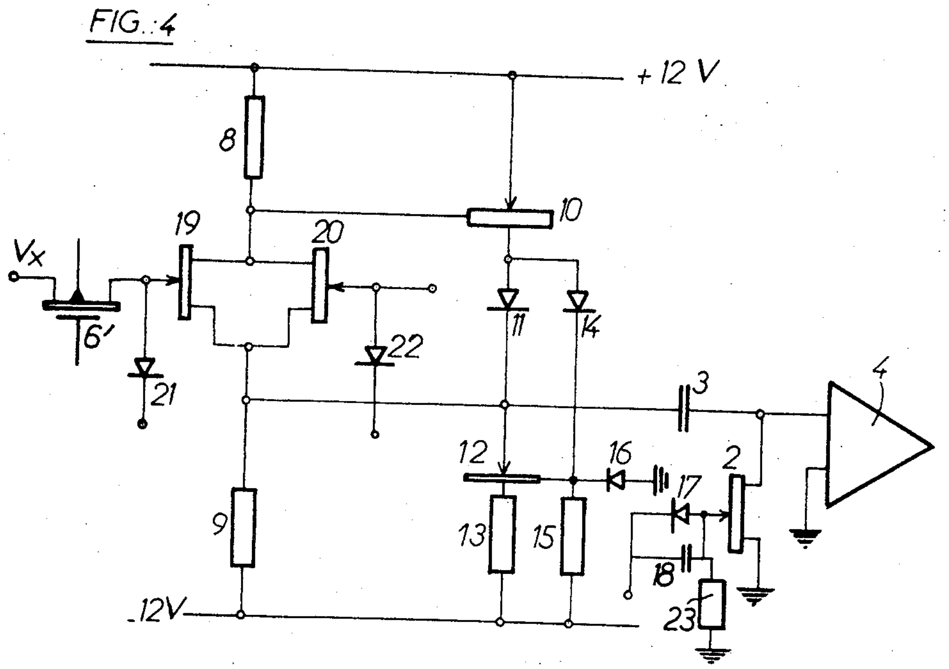

In the drawings, besides FIG. 1 referred to precedingly,

FIG. 2 is a skeleton diagram of an analog-decimal converter according to the invention; and FIGS. 3 and 4 are more detailed diagrams of embodiments according to this invention.

In FIG. 2, like parts with like functions are designated by like reference numerals. In the arrangement shown thereon, amplifier 1, capacitor 3 and comparator 4 are connected in series directly, without an interposed switch.

Switch 2 is in this case shunt-connected to earth from the comparator input (which is also the amplifier output). The amplifier may have any desired gain, though it is simpler to take steps for it to be in the region of unity; its drift will have no effect because the amplifier is crossed both by the voltages $Vx$ to be encoded and the reference voltages $V_L$ from the ladder network (not shown, controlled by the comparator).

At the input end of amplifier 1 are provided two switches 6' and 6 one of which is closed while the other is open, and vice-versa, for the purpose of applying the voltage to be encoded and the reference voltage $V_L$ respectively. The positions of switches 2, 6, and 6' are illustrated in dotted lines for the sampling period and in full lines for the encoding period respectively. A chain-dotted line shows diagrammatically that the movements of said switches are advantageously synchronized.

During the sampling period, switches 6' and 2 are conducting; capacitor 3 charges to the value $Vx$ and consequently stores this voltage (to within a possible shift and to within its own gain). During the encoding or comparison period proper, switches 6' and 2 are non-conducting and switch 6 is conducting. Capacitor 3 retains the same charge but the output voltage of amplifier 1 shifts as a function of the value of the comparison voltage $V_L$ (to within the same shift and the same gain as during the sampling period in the case of $Vx$). A voltage proportional to $V_L - Vx$ is thus applied to the input of comparator 4, which comparator detects the sign of this input voltage.

In the above arrangement, amplifier 1 is no more than a simple impedance matcher and no longer an operational amplifier and can therefore be of simpler design than in the prior art arrangement. It may have low output impedance without danger of oscillating and can be faster. (The amplifier with a gain strictly equal to unity used in the prior art arrangement is feasible in practice only with a relooped high-gain amplifier, and the response time of such an arrangement remains relatively long).

In practice, if an output impedance of 10 ohms and a switch impedance of 30 ohms are used, the amplifier will be capable of charging a memory capacitor of 10 nF in 3$\mu$s.

Further, it is interesting to note in the arrangement of FIG. 2 that the error terms due to the stray capacitances referred to precedingly (grid-drain and source-drain when the switch is a field-effect transistor) are greatly reduced. A comparison between the error terms issuing from the switch 2 in FIG. 1 and the switch 2 in FIG. 2 shows that the latter switch does not transmit voltage variations dependent on $V_x$ but only a constant term resulting from the passage of its control electrode from earth potential to the potential corresponding to the non-conducting state of that switch. As for the switch 6' in FIG. 2, it does not introduce an error term due to variation of the control voltage since steps are taken so that the command for opening of 6' occurs slightly after the command to open switch 2 (and also so that the command to close switch 6 likewise occurs a little after the command to open switch 2). Further, the error voltage due to the variation in $V_x$ is rendered negligible because the impedance of the ladder network is low by comparison with the impedance resulting from the parasitic drain-source capacitance of switch 6'.

Moreover, since the comparator now functions about a single operating point only, to wit earth, any errors due to poor response linearity of the comparator can be ignored.

While it is true that input switches 6' and 6 have input capacitances, the effect of the latter introduces no errors and merely retards the establishment of voltages $V_x$ and $V_L$ (and this can be remedied to some extent) and hence merely reduces the operating speed of the system.

Such a schematic diagram could be materialized for example by adopting the diagram shown in FIG. 3, which relates to a relatively slow, high-precision encoding sampler capable of supplying up to ten bits.

In the embodiment of FIG. 3, the input of amplifier 1 is driven through the medium of two MOS transistors constituting the switches 6 and 6'. At the input end of amplifier 1 is a field-effect transistor 7 which receives the input signals on its grid and is connected across the +12V and −12V potentials via resistors 8 and 9, respectively. The emitter-base junction of a pnp type transistor 10 shunts resistor 8. A diode 11 has its anode connected to the collector of transistor 10 and and its cathode connected to the source of transistor 7, and there is provided the series combination of a pnp type transistor 12 and a resistor 13 shunted on resistor 9. The collector of transistor 10 is connected through a diode 14 to the base of transistor 12, which base is connected to the −12V potential via a resistor 15 and is earthed via a diode 16.

The mutual point A for the source of transistor 7, the cathode of diode 11 and the emitter of transistor 12 is connected to one of the plates of capacitor 3, the other plate thereof being connected to the comparator input and to a switch 2 in the same way as shown in FIG. 2. In the embodiment of FIG. 3, this switch is a field-effect transistor which can be controlled by applying a voltage to its grid through a diode 17 which is shunted by a capacitor 18, said grid being earthed through an appropriate resistor 23.

The above-described arrangement is so devised as to ensure that the input amplifier has a high input impedance in relation to that of the ladder network or the source of the signal to be encoded.

The sampling and encoding cycle is divided into two periods: a sampling period and a comparison period proper of substantially equal duration. During the sampling period, operation of the device is dependent on the relative values of the analog voltage to be analyzed and of the voltage stored in the memory capacitor in the initial stage (corresponding either to another input quantity to be encoded or to another sampling point of equal input magnitude to be encoded).

It will be assumed first that the amplitude of the analog voltage to be analyzed is less than the voltage stored in the memory capacitor in the initial state. In that event transistor 7 and hence transistor 10 become blocked, the base of transistor 12 is raised substantially to earth potential whereby transistor 12 becomes conducting and thereby offers capacitor 3 a low-impedance discharge circuit, for resistor 13 has low resistance by comparison with that of resistor 9 which must limit the closed-circuit current through field-effect transistor 7 and transistor 10. If the converse assumption is made, transistor 7 is conducting and the current passing through resistor 8 biases transistor 10, thereby to cause capacitor 3 to charge.

During the comparison period proper, switches 6' and 2 are disabled and the voltage $V_L$ is transmitted through enabled switch 6.

Such an encoding sampler can be accurate since it has no element capable of introducing a linearity defect other than the voltages $V_L$ themselves, and the drifts are compensated. The device is relatively slow, because each weight of the ladder network must charge the parasitic capacitances of the two switches 6' and 6 and the input capacitance of the amplifier. The slower the encoding rate, the higher may be the value chosen for capacitor 3: with 100 kbits, for example, a capacitance in the region of 100,000 pF may be adopted. The errors due to the parasitic capacitances of the input gate then become negligible.

The embodiment shown in FIG. 4 relates to a faster type of encoding sampler, in which like parts to those in FIG. 3 are designated by like reference numerals and perform the same functions. This arrangement differs from that in FIG. 3 only in that transistor 7 is replaced by a compound field-effect transistor 19-20. Switching from one period to the next is effected in this case by allowing one or the other of transistors 19 and 20 to be conducting by applying corresponding voltages to the diodes 21 and 22.

During the sampling period, switches 6' and 2 are enabled, diode 21 is raised to +6V and diode 22 to −2V. Transistor 19 is conducting and transistor 20 is blocked, whereby capacitor 3 charges.

During the comparison period proper, switches 6' and 2 are disabled, diode 21 is at −2V and diode 22 at +6V. Transistor 19 is blocked and transistor 20 conducting, whereby voltage $V_L$ is transmitted. In this case the ladder network is required merely to charge the amplifier input capacitor and the diode capacitor, representing approximately 10 pF.

Hence in this arrangement the compound amplifier 19-20 simultaneously performs the function of switching the input voltage. MOS transistor 6' is utilized solely, if necessary, for isolating the voltage to be encoded $V_x$ from the control circuit of diode 21 when the latter is conducting.

It goes without saying that changes may be made in the forms of embodiment hereinbefore described without departing from the scope of the present invention.

Further, the subject method and device of this invention are by no means limited to the art of analog-digital encoders of the weighted type and are applicable whenever an analog voltage must be sampled and then compared to a reference voltage. A specific non-limitative example of such application is for signalling or warning purposes, for performing an amplitude-time conversion ($V_L$ being a voltage which is variable at the start of a series), possibly followed by clock-pulse counting (analog-digital encoder of the ramp type), and in this case the encoding-sampler device would include a clock and a gate for connecting the latter to a counter, with the comparator controlling starting and stopping of the counter which receives the clock-pulses.

We claim:

1. In an analog-digital converting device comprising an amplifier having input means, a memory capacitor having a first and second plate, and a comparator having input means, all being associated with connection means and switching means to permit functioning in successive first and second periods controlled by the working of said switching means, said first period being a sampling period during which an input analog voltage is applied to said amplifier which charges said capacitor, and said second period being a comparing period for comparing the previously sampled voltage during which said comparator compares the capacitor voltage with a reference voltage; the improvement wherein said switching means comprise a plurality of distinct switching elements, said elements being constructed and arranged to be connected to the input of the amplifier and to the input of the comparator respectively and to be concomitantly actuated, and the connection means and the switching means being constructed and arranged whereby the output of said amplifier is connected to a first plate of said capacitor, and the second plate of said capacitor is connected to said input means of said comparator and also, through a switching element closed only during said first period, to the earth, whereby the analog input voltage and the reference voltage are alternatively applied, namely the former voltage during the first period and the latter during the second period, to the input of said amplifier through respective switching elements.

2. A device as claimed in claim 1 wherein said amplifier has an amplification gain not equal to unity.

3. Device according to claim 1 wherein said amplifier is of the linear type.

4. A device as claimed in claim 1 including means for supplying the reference voltage in coded form, said means being controlled by said comparator.

5. A device as claimed in claim 1 wherein said comparator controls transmission or cutting off of the pulses issuing from a clock by operating on a gate electrically connected into a link between said clock and a counter.

6. A device as claimed in claim 1 wherein the input means of the amplifier is formed by a two-part amplifier stage the input into each of the two parts of which is connected to a diode and performs in succession the functions of amplifier and switch.

7. A device as claimed in claim 6, including a switch for applying the analog voltage to one of the two component parts of said two-part input amplifier stage.

8. A device a s claimed in claim 6, wherein the input element of the amplifier is a field-effect transistor.

* * * * *